E. L. PERRY.
Hose or Tubing.
No. 219,596. Patented Sept. 16, 1879.
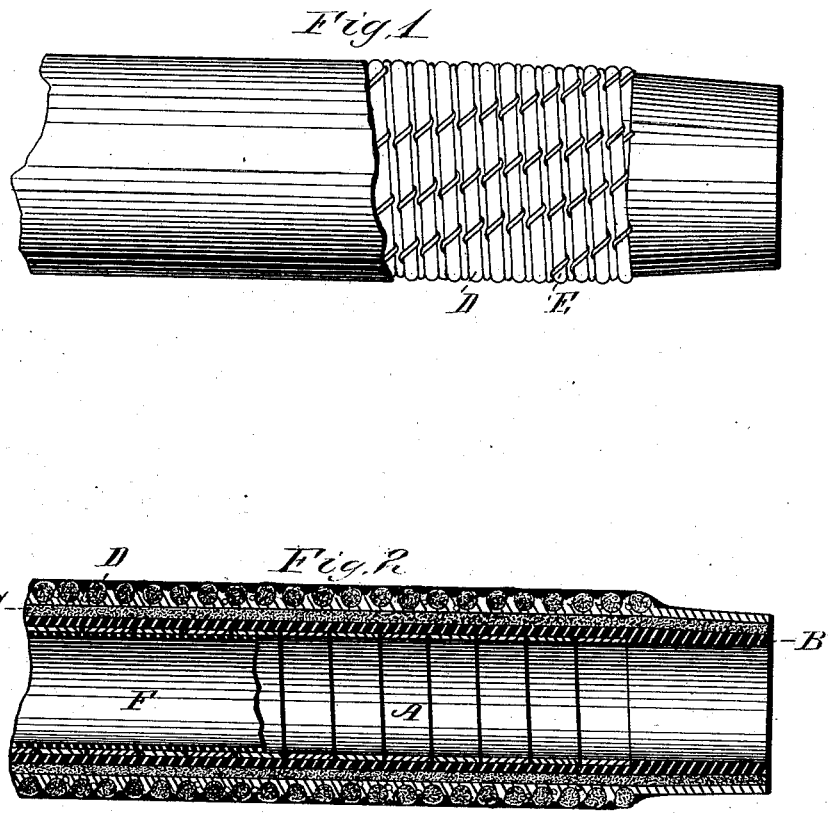

UNITED STATES PATENT OFFICE.

EDWARD L. PERRY, OF PATERSON, NEW JERSEY.

IMPROVEMENT IN HOSE OR TUBING.

Specification forming part of Letters Patent No. 219,596, dated September 16, 1879; application filed February 12, 1879.

*To all whom it may concern:*

Be it known that I, EDWARD L. PERRY, of Paterson, in the county of Passaic and State of New Jersey, have invented a new and valuable Improvement in Hose or Tubing; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of my invention with a portion of the outer covering removed. Fig. 2 is a longitudinal vertical section of the same with a portion of the inner fibrous lining removed.

This invention has relation to steam, suction, or other similar hose, but more particularly to that class of tubing known as "brake-tubes," to be used in connection with the vacuum-brake; and the object or purpose thereof is to construct the hose or tube in a manner that will render it durable, lasting, and not easily abraded or cut, either by accident or maliciousness, as will be hereinafter described.

In the accompanying drawings, A represents a series of metal rings or a coil of metal, which, in constructing the tube, is placed over a mandrel of the desired diameter and length; and if rings are used they are placed at proper distances apart upon the mandrel, and filled in between with a rubber or other suitable compound. At each end may be placed two or more of the rings, close together, to form a ferrule, into which the shank of the coupling enters, thereby preventing the tube, close to the coupling, from breaking down.

Over the metal coil A is placed a tube, B, of india-rubber or other flexible material, and over this one or more layers of duck or fibrous material suitable for the purpose, after which is placed another layer of rubber, as shown at C, and over all is wound hard-twisted cotton or other suitable fibrous cord, D, intertwined with wire, E, of suitable metal, the whole, when vulcanized, forming a solid and compact tube.

When used for steam, it is found necessary to line the interior surface of the tube with duck, F, or other similar fibrous material, without any coating of india-rubber.

A hose or tube constructed as above described may be employed for various purposes, as I do not desire to be understood as confining myself to any of the hereinbefore-mentioned uses.

The tube will stand great pressure, and possesses durable qualities, as it cannot be easily cut or otherwise injured by ordinary use, which renders it extremely valuable as a brake-tube in connection with vacuum-brakes.

Having now fully described my invention, what I claim as new, and desire to secure by Letters Patent, is—

1. A hose or tube consisting of a series of metal rings or coils, A, having placed over the same an elastic covering, B, and over this a covering of hard-twisted cotton or other fibrous cord, D, intertwined with metal wire, E, substantially as and for the purpose specified.

2. A hose or tube consisting of the metal rings or coils A and coverings B C D E, arranged in relation to each other as and for the purpose described.

In testimony that I claim the above I have hereunto subscribed my name in the presence of two witnesses.

EDWARD L. PERRY.

Witnesses:
EDWARD W. PERRY,
HENRY S. WINANS.